Nov. 2, 1943.                S. B. HASELTINE                2,333,249
FRICTION SHOCK ABSORBING MECHANISM
Filed June 9, 1941                    2 Sheets-Sheet 1
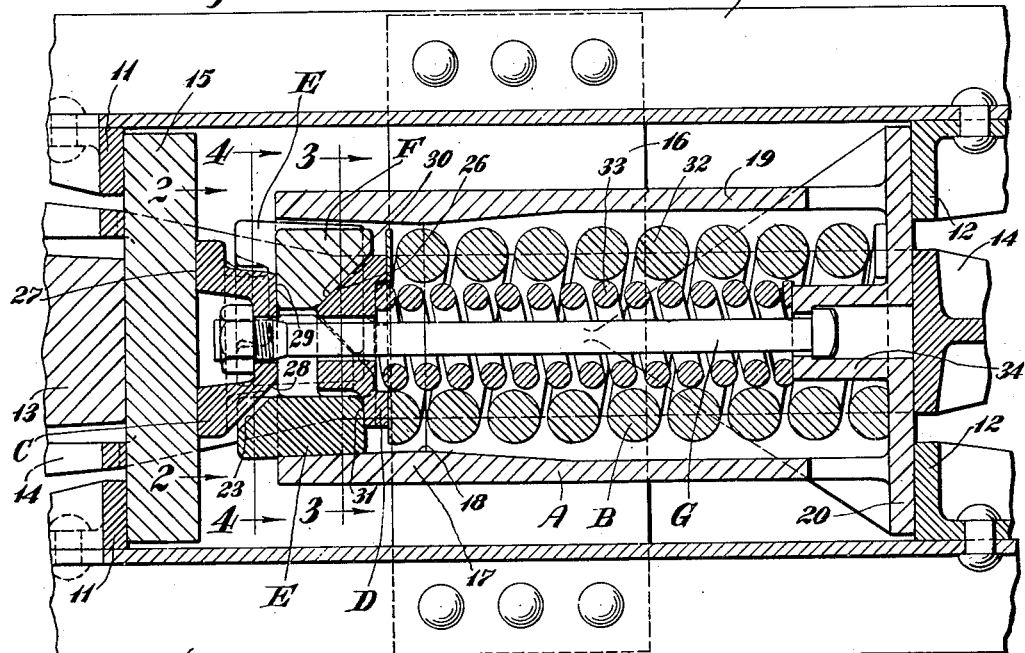
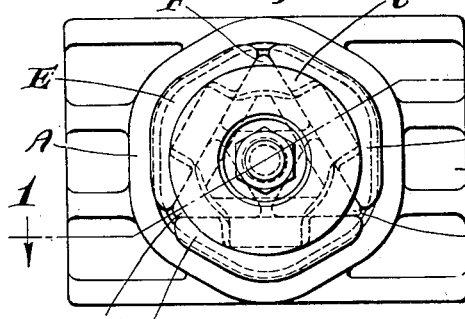
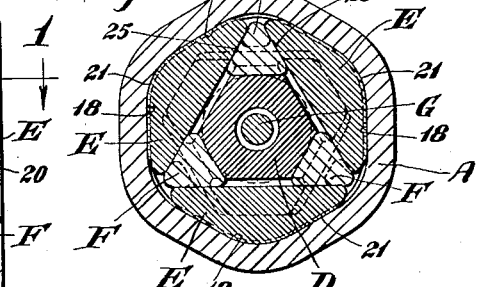
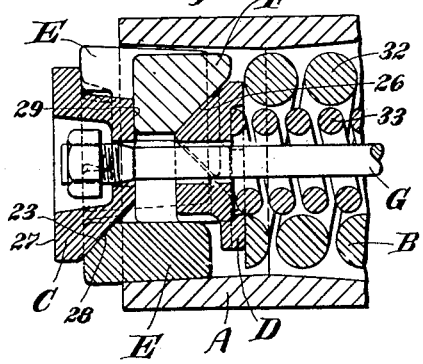
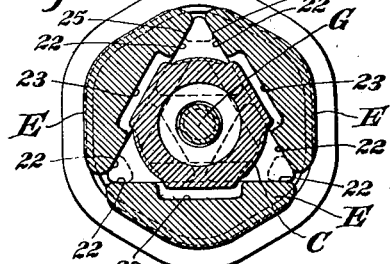
Inventor
Stacy B. Haseltine
By Henry Fuchs.
Atty.

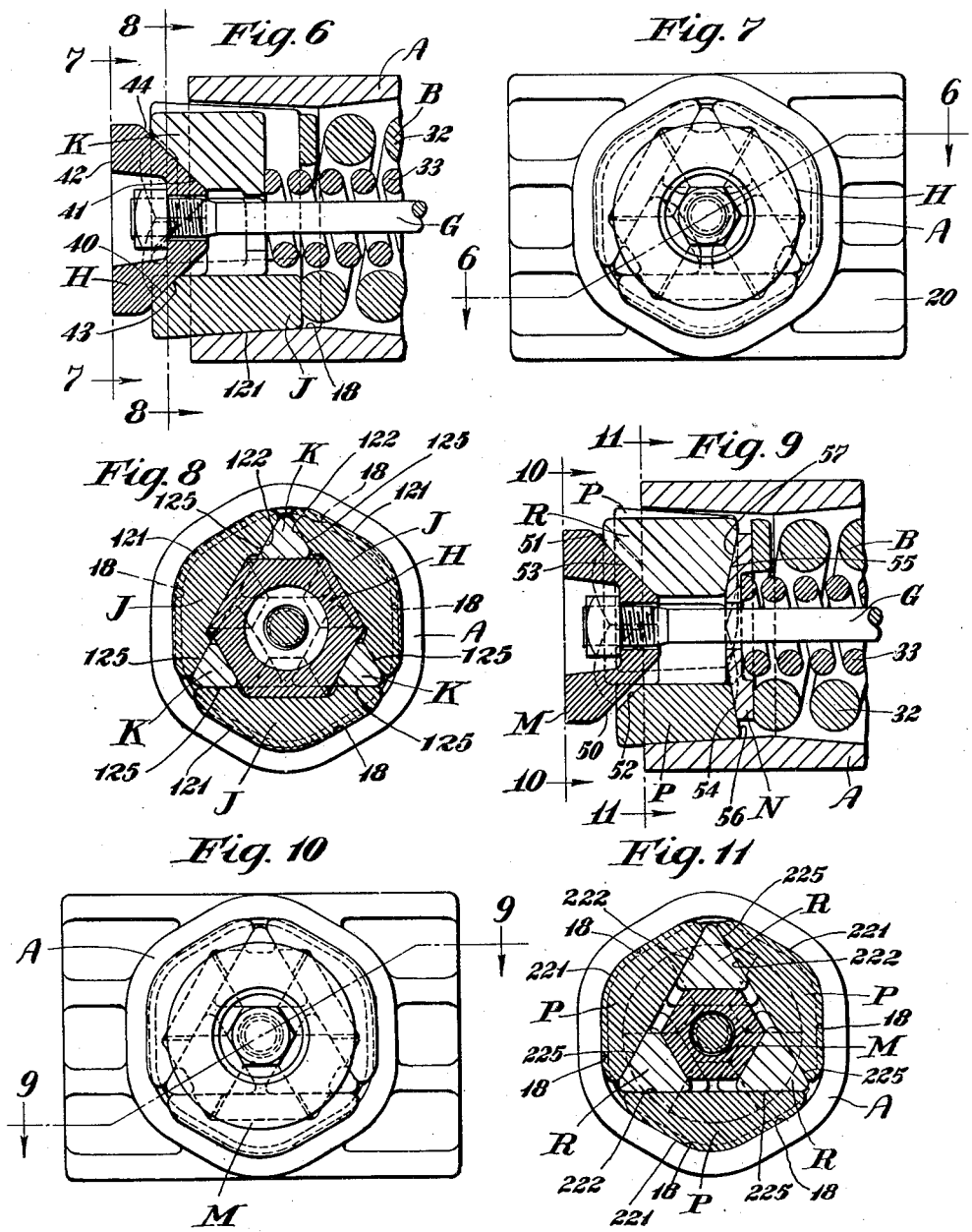

Patented Nov. 2, 1943

2,333,249

UNITED STATES PATENT OFFICE 2,333,249

FRICTION SHOCK ABSORBING MECHANISM

Stacy B. Haseltine, La Grange, Ill., assignor to W. H. Miner, Inc., Chicago, Ill., a corporation of Delaware Application June 9, 1941, Serial No. 397,205

8 Claims. (Cl. 213—24)

This invention relates to improvements in Friction shock absorbing mechanisms.

One object of the invention is to provide an efficient shock absorbing mechanism of high capacity, especially adapted for railway draft riggings, wherein friction is created by a spring resisted friction clutch cooperating with a friction casing, the clutch being composed of a central wedge, three friction shoes, and auxiliary or secondary wedge blocks interposed between the wedge and shoes, the shoes having sliding frictional contact with the interior of the casing and the auxiliary wedge blocks having wedging contact with the shoes, relative sliding movement of the shoes and auxiliary wedge blocks with respect to the central wedge being produced by providing the casing with a tapered friction shell section by which the clutch is contracted during compression of the mechanism as it is forced into the casing, thereby providing differential action between the parts of the clutch to elongate the latter and increase the compression of the spring resistance with resultant increase in capacity.

A further object of the invention is to provide a mechanism of the character indicated in the preceding paragraph, wherein a pressure transmitting element is employed to actuate both the auxiliary wedge blocks and shoes, and wedging action is produced directly between the wedge and shoes.

Still another object of the invention is to provide a shock absorbing mechanism comprising a friction clutch cooperating with a friction casing, wherein the clutch includes friction shoes, wedge blocks engaging between adjacent shoes to spread the same apart circumferentially, means for wedging the wedge blocks apart, and means for wedging the shoes radially outwardly against the friction surfaces of the casing independently of the action of the wedge blocks, after a predetermined compression of the mechanism, thereby providing relatively light initial resistance followed by high shock absorbing capacity during the remainder of the compression action of the mechanism.

Other objects of the invention will more clearly appear from the description and claims hereinafter following.

In the drawings forming a part of this specification, Figure 1 is a horizontal, longitudinal sectional view of a portion of a railway draft rigging showing my improvements in connection therewith, the section corresponding substantially to the line 1—1 of Figure 2. Figure 2 is a front elevational view of the shock absorbing mechanism proper. Figures 3 and 4 are transverse vertical sectional views, corresponding respectively to the line 3—3 and 4—4 of Figure 1. Figure 5 is a view, similar to Figure 1, of the front end portion of the shock absorbing mechanism only, illustrating the position of the parts after partial compression of the device. Figure 6 is a view similar to Figure 1, illustrating another embodiment of the invention, and showing only the front end portion of the shock absorbing mechanism, the section corresponding substantially to the line 6—6 of Figure 7. Figure 7 is a front elevational view of Figure 6. Figure 8 is a transverse, vertical sectional view corresponding substantially to the line 8—8 of Figure 6. Figure 9 is a view similar to Figure 6 showing still another embodiment of the invention, the section corresponding substantially to the line 9—9 of Figure 10. Figure 10 is a front elevational view of Figure 9. Figure 11 is a transverse vertical sectional view, corresponding substantially to the line 11—11 of Figure 9.

In said drawings, 10—10 denote channel draft sills of a car underframe, to the inner faces of which are secured front stop lugs 11 and rear stop lugs 12. A portion of a draw bar is indicated at 13, with which is operatively associated a hooded cast yoke 14, the latter having disposed therewithin the shock absorbing mechanism proper, hereinafter described, and a front follower 15. The yoke and parts therewithin are supported in operative position by a detachable saddle plate 16.

Referring first to the embodiment of the invention illustrated in Figures 1 to 5 inclusive, my improved shock absorbing mechanism proper, as shown, comprises a casing A including a combined friction shell and spring cage; a spring resistance B; a pressure transmitting wedge block C; a combined spring follower and wedge D; three friction shoes E—E—E; three secondary wedge elements F—F—F; and a retainer bolt G.

The casing A, as shown, is of hexagonal cross section having a friction shell proper 17 at its outer end, the latter being provided with interior flat friction surfaces 18—18 arranged symmetrically with respect to the axis of the shell, thereby presenting a friction shell of hexagonal interior cross section. Rearwardly of the shell 17 proper, the casing A is formed with a spring cage 19 and at its rear end with an integral vertical wall 20, the latter being suitably laterally extended and reinforced to adapt it to function as the rear follower of the mechanism.

The shoes E, which are three in number, are of like construction, each having an outer friction surface 21 of V-shaped cross section cooperable with two adjacent shell friction surfaces 18—18. Each shoe E is further provided with longitudinally extending flat wedge-face portions 22—22 on the inner side thereof, said faces being on opposite sides of the longitudinal center line of said inner side. Thus, the wedge-face portion 22 at each side end portion of the rear side of each shoe lies adjacent and opposed to the corresponding face portion 22 of the shoe immediately adjacent thereto. These opposed faces 22—22 of each two adjacent shoes E converge radially outwardly of the shell with an included angle therebetween of approximately 60°. At the forward end, each shoe is provided with a longitudinally extending wedge face 23 which is inset, as shown most clearly in Figures 1 and 4. The three faces 23—23—23 converge inwardly of the mechanism.

The wedge elements F are three in number and each is of triangular cross section, as shown most clearly in Figure 3. Each member F has a pair of wedge faces 25—25 converging radially outwardly of the shell, each wedge face 25 cooperating with a shoe-wedge face 22 in such a manner as to tend to separate the shoes E circumferentially. At its inner end, each secondary wedge F has a wedge face 26. The wedge faces 26—26—26 of the three shoes E—E—E converge forwardly of the shell, as clearly shown in Figure 1.

The pressure transmitting wedge block C has a flat transverse front face 27 bearing on the inner side of the front follower 15. At its inner end, the block C has three wedge faces 28—28—28 arranged symmetrically about the axis of the mechanism adapted to cooperate with the wedge faces 23—23—23 of the shoes E—E—E, and correspondingly inclined thereto. At the inner end, the block C has a flat transverse face 29 adapted to engage the front ends of the secondary wedge elements F—F—F. As will be seen upon reference to Figure 1, the wedge faces 28—28—28 of the block C are positioned in such a manner that they are spaced from the wedge faces of the shoes E—E—E, in the normal full release position of the parts of the mechanism.

The combined spring follower and wedge D is in the form of a block having three wedge faces 30—30—30 at its forward end, symmetrically spaced about the axis of the mechanism and cooperating with the wedge faces 26—26—26 at the rear ends of the secondary wedge elements F—F—F and correspondingly inclined thereto. At the forward side thereof, in alignment with the shoes E—E—E, the combined spring follower and wedge D is provided with transverse flat abutment faces 31 which bear on the inner ends of the shoes E—E—E.

The spring B is preferably in the form of two coils, an outer heavy coil 32 and a lighter inner coil 33. The coils 32 and 33 at their forward ends bear directly on the combined spring follower and wedge D. At the rear end, the coil 32 bears on the rear wall 20 of the casing A and the coil 33 on an inwardly projecting hollow boss 34 on said rear wall 20.

The retainer bolt G is anchored at its rear end within the hollow boss 34 and at its forward end within a suitable recess provided in the pressure transmitting block C.

The operation of my improved shock absorbing mechanism, as illustrated in Figures 1 to 5 inclusive, is as follows: In either a buff or draft stroke of the rigging the block C will be forced inwardly of the casing A, the block being moved rearwardly as the front follower 15 is moved inwardly in buff while the casing is held stationary by the rear stop lugs 12—12, and the casing A being moved forwardly, in draft, while the block C is held stationary by engagement with the front follower 15 which is held against movement by the front stop lugs 11—11. As the block C is moved inwardly of the casing, the secondary wedges F—F—F are carried rearwardly therewith, thereby forcing the wedge faces 26 thereof against the wedge faces 30 of the spring resisted combined follower and wedge D, thus setting up a spreading action radially upon the secondary wedges F—F—F. The wedges F being forced outwardly wedge the shoes E—E—E apart circumferentially, thereby pressing the same against the friction surfaces of the casing. Inasmuch as the friction shell of the casing is inwardly tapered, the resistance to longitudinal movement between the shoes and the casing is greater than the resistance to relative longitudinal movement between the shoes and secondary wedges, and the latter will slide inwardly of the shoes until the wedge faces of the pressure transmitting block C come into engagement with the wedge faces of the shoes E, as shown in Figure 5, whereupon the latter will be forced to slide inwardly on the casing friction surfaces. During this initial action referred to, due to the relative movement between the secondary wedges F—F—F and the shoes E—E—E, the combined spring follower and wedge D will be forced away from the rear ends of the shoes, thereby providing clearance therebetween, as shown in Figure 5. Due to the taper of the casing, the friction clutch, comprising the wedge blocks C and D, the shoes E—E—E, and the secondary wedge elements F—F—F is contracted, the shoes E—E—E being forced to move slightly laterally toward each other. Such inward or differential movement of the shoes E—E—E is automatically compensated for by slippage of the secondary wedges F—F—F on the wedge faces of the combined wedge and spring follower D, and slippage of the wedge faces of the shoes E—E—E on the wedge faces of the pressure transmitting block C. The clutch as a whole will thus be elongated, further compressing the spring resistance B, thereby increasing the capacity of the gear. As will be evident, light initial action is provided during the movement of the secondary wedges F—F—F, rearwardly on the shoes E—E—E, followed by high capacity, during movement inwardly of the shoes in unison with the pressure transmitting wedge member C by which the shoes are also wedged radially outwardly.

Upon removal of the actuating force, the expansive force of the spring B will return all of the parts to normal position, the spring follower being forced outwardly and carrying the secondary wedges F—F—F therewith, and the latter by their shouldered engagement with the pressure transmitting block C carrying the same outwardly also. After the clearance has been taken up between the spring follower D and the inner ends of the shoes E—E—E, the latter will be carried forwardly therewith until movement of the block C is limited by the retainer bolt G. As will be evident, easy release is effected due to the secondary wedges being moved outwardly before the shoes E—E—E are forced to move by positive engagement therewith of the combined wedge and spring follower D, thus effecting positive release of the pressure transmitting wedge C from wedging engagement with the shoes, the wedge C being moved outwardly in unison with the secondary wedges F—F—F.

It will be further noted that, due to the wedge pressure transmitting member C being forced to move outwardly with the secondary wedges F—F—F, the wedge faces of said member C will be separated from the shoes before the latter are forced to move by engagement of the combined wedge and spring follower D therewith, thereby greatly facilitating release of the mechanism.

Referring next to the embodiment of the invention illustrated in Figures 6, 7, and 8, the same comprises a friction casing in all respects similar to the friction casing A, hereinbefore described and also indicated by A; a spring resistance similar to the spring B hereinbefore described and also indicated by B; a pressure transmitting wedge block H; three friction shoes J—J—J; three secondary wedges K—K—K; and a retainer bolt identical with the retainer bolt G and also indicated by G.

The friction shoes J have outer V-shaped friction surfaces 121—121—121 identical with the friction surfaces 21—21—21, hereinbefore described, and cooperating with the shell friction surfaces 18—18 of the casing A. At the forward end, each shoe is provided with a wedge face 40, the wedge faces 40—40—40 of the three shoes converging inwardly of the mechanism. Each shoe J is further provided with longitudinally extending wedge faced edges 122—122, corresponding to the faces 22—22 of the shoe E hereinbefore described.

The secondary wedge elements K—K—K each have a pair of wedge faces 125—125 converging radially outwardly of the shell, each wedge face 125 cooperating with a shoe wedge face 122 in such a manner as to tend to separate the shoes circumferentially. At its outer end, each secondary wedge K has a wedge face 41, the three wedge faces of the wedges K—K—K converging inwardly of the casing, as clearly shown in Figure 6.

The pressure transmitting wedge block H has a flat front face 42 adapted to bear on the front follower of the rigging. At its inner end, the block H is provided with six wedge faces 43—43—43 and 44—44—44 arranged symmetrically about the longitudinal central axis of the mechanism and converged inwardly of the latter, the faces 43 being alternated with the faces 44. The faces 43 are correspondingly inclined to the faces 40 of the shoes J and cooperate therewith, and the faces 44 are correspondingly inclined to the faces 41 of the secondary wedge blocks K and cooperate with the same.

The two coils 32 and 33 of the spring B bear on the inner ends of the shoes J and the secondary wedge blocks K, respectively.

The operation of the device shown in Figures 6, 7, and 8 is as follows: Upon compression of the mechanism the shoes J—J—J are wedged apart radially outwardly by the wedge block H while they are also spread apart circumferentially by the secondary wedges K—K—K, which, in turn, are forced radially outwardly by the cooperating wedge faces of said secondary wedges and the wedge block H. The spring coils acting independently on the shoes J and the secondary wedges K permit relative longitudinal movement of the shoes and secondary wedges due to the differential action produced by the taper of the friction shell.

Referring next to the embodiment of the invention illustrated in Figures 9, 10, and 11, the improved mechanism comprises a friction casing identical with the friction casing A hereinbefore described, and also indicated by A; a spring resistance B identical with the spring B hereinbefore described, and also indicated by B; a wedge block M; a spring follower N; three friction shoes P—P—P; three secondary wedges R—R—R; and a retainer bolt identical with the retainer bolt G hereinbefore described and also indicated by G.

The wedge block M has six inwardly converging wedge faces 50—50—50 and 51—51—51, the faces 50 being alternated with the faces 51. At the outer end, the wedge block M has a flat transverse face adapted to bear on the front main follower of the draft rigging.

The friction shoes P, which are three in number, have outer V-shaped friction surfaces 221—221—221 identical with the friction surfaces 21—21—21 hereinbefore described, and cooperate with the shell friction surfaces 18—18 of the casing A. At the forward end, each shoe is provided with a wedge face 52 correspondingly inclined to and cooperating with one of the wedge faces 50 of the wedge M. Each shoe is further provided with longitudinally extending wedge faced edges 222—222 corresponding to the faces 22—22 of the shoes E hereinbefore described.

The secondary wedge elements R, which are three in number, each have a pair of wedge faces 225—225 converging radially outwardly of the shell, similar to the wedge faces 22—22 of the elements F hereinbefore described, each wedge face 225 cooperating with a shoe wedge face 222 in such a manner as to tend to separate the shoes circumferentially. At the outer end, each secondary wedge R has a wedge face 53, the three wedges faces of the secondary wedges R—R—R being correspondingly inclined to the wedge faces 51—51—51 of the block M and cooperating therewith.

The spring follower N is interposed between the spring B and the inner ends of the shoes P and secondary wedge blocks R and has six substantially blunt wedge faces 54—54—54 and 55—55—55 at its forward side arranged symmetrically around the longitudinal axis of the mechanism, the faces 54 being alternated with the faces 55 and engaging correspondingly inclined wedge faces 56 and 57 at the inner ends of the shoes P and the secondary wedges R, respectively.

As will be seen upon reference to Figure 9, in the normal full release position of the parts, the wedge faces 53 of the secondary wedges R engage the wedge faces 51 of the wedge block M, but clearance is provided between the cooperating wedge faces 52 and 50 of the shoes P and the wedge block M.

In compression of the mechanism the wedge block M is forced inwardly of the casing, spreading the secondary wedge elements R apart, and wedging the same between the shoes P to spread the latter circumferentially and force the same into tight frictional contact with the casing. Due to the taper of the casing, greater resistance is offered to relative sliding movement of the shoes on the casing friction surfaces than to sliding movement of the secondary wedges inwardly on the shoes. Thus, during the first part of the compression stroke, the secondary wedges R are forced to slide inwardly on the shoes P against the resistance of the spring B. This action continues until the clearance between the wedge faces 50 of the wedge M and the faces 52 of the shoes P is taken up, whereupon the shoes are wedged apart radially in addition to their circumferential separation by the secondary wedges R and are forced to slide inwardly of the casing, thereby providing high capacity during the remainder of the compression stroke. Due to the taper of the casing, the clutch comprising the wedge M, shoes P, and secondary wedges R will be contracted, thereby squeezing out the shoes and secondary wedge blocks between the casing friction surfaces and the wedge faces of the wedge block, thus elongating the clutch and effecting additional compression of the spring with resultant increase in capacity.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a friction casing having interior friction surfaces; of a spring resistance yieldingly opposing inward movement of the shoes; a plurality of mutually adjacent friction shoes disposed about the central longitudinal axis of the mechanism and cooperating with the casing surfaces, each shoe having longitudinally disposed flat wedge face portions on the inner side thereof at opposite sides of the longitudinal center of said shoe, said wedge face portions of adjacent shoes at adjacent sides of the longitudinal centers thereof converging laterally toward each other in a direction away from the longitudinal central axis of the mechanism, each shoe having an inner wedge face at the front end thereof inclined outwardly away from the central longitudinal axis of the mechanism in a direction lengthwise of said axis; a pressure transmitting block having wedge faces cooperating with said last named wedge faces of the shoes; secondary wedges engaged by said block and provided with laterally outwardly converging wedge faces cooperable with said wedge face portions of the shoes; and means for spreading said secondary wedges apart.

2. In a friction shock absorbing mechanism, the combination with a friction casing having interior friction surfaces; of a friction clutch slidable within the casing; and means yieldingly opposing inward movement of said clutch, said clutch including friction shoes engaging all of said interior friction surfaces of the casing, wedge means for spreading said shoes radially apart, wedge blocks having wedging engagement between adjacent sides of adjacent shoes for spreading the same apart circumferentially, and wedge means for forcing said wedge blocks radially apart.

3. In a friction shock absorbing mechanism, the combination with a friction casing having interior friction surfaces; of a spring resistance; friction shoes having sliding frictional engagement with the friction surfaces of the casing; a pressure transmitting block having wedging engagement with the outer ends of said shoes to spread the same apart radially of the longitudinal axis of the casing; a spring follower interposed between the spring resistance and inner ends of the shoes, said spring follower having forwardly converging wedge faces; and secondary wedges having wedge faces in wedging engagement with said spring follower wedge faces to spread said secondary wedges apart radially to the longitudinal central axis of the casing, said secondary wedges having radially outwardly converging wedge faces engaging between adjacent sides of adjacent shoes to spread the same apart circumferentially, said secondary wedges being engaged by said pressure transmitting block to be forced inwardly of the casing.

4. In a friction shock absorbing mechanism, the combination with a friction casing having interior friction surfaces; of a spring resistance; friction shoes having lengthwise sliding engagement with the friction surfaces of the casing; a pressure transmitting block having wedging engagement with the outer ends of the shoes during compression of the mechanism to spread the same apart radially of the longitudinal axis of the casing; a spring follower bearing on the inner ends of the shoes, said follower having forwardly converging wedge faces; and secondary wedges having wedge faces in wedging engagement with the wedge faces of said spring follower to effect spreading of said secondary wedges apart radially to said axis, said secondary wedges having radially outwardly converging wedge faces engaging between adjacent sides of adjacent shoes to spread the same apart circumferentially, said pressure transmitting block being engaged by the front ends of said secondary wedges, and normally held in position separated from the shoes to provide for preliminary action of said secondary wedges until the shoes are engaged in wedging relation by said pressure transmitting block.

5. In a friction shock absorbing mechanism, the combination with a friction casing having interior friction surfaces; of a pressure transmitting block having inwardly converging wedge faces at its inner end; a set of annularly arranged friction shoes having frictional engagement with the friction surfaces of the casing, said shoes having wedge faces at their outer ends cooperating with the wedge faces of said block; a spring follower having a projection thereon provided with forwardly converging wedge faces, said spring follower bearing on the inner ends of the shoes; means yieldingly resisting inward movement of said spring follower; and secondary wedges having wedging engagement with said wedge faces of the projection of the spring follower to spread said secondary wedges apart, said secondary wedges bearing at their outer ends on the pressure transmitting block, said secondary wedges having radially outwardly converging wedge faces engaging between adjacent sides of adjacent shoes to spread the shoes apart circumferentially.

6. In a friction shock absorbing mechanism, the combination with a friction casing having interior friction surfaces; of friction shoes cooperable with the casing surfaces and having on their inner sides wedge face portions extending lengthwise of the mechanism at opposite sides of the longitudinal center of said inner side of each shoe, said wedge face portions at adjacent sides of the inner faces of adjacent shoes converging laterally outwardly, and wedge faces at their front ends inclined outwardly away from the central longitudinal axis of the mechanism in a direction lengthwise of said axis; a pressure transmitting wedge block having rearwardly extending inwardly converging wedge faces; secondary wedges having wedge faces at their outer ends engaged by certain of said wedge faces of said block, the remaining wedge faces of said block having wedging engagement with the wedge faces at the front ends of said shoes, said secondary wedges also having radially outwardly converging wedge faces cooperable with the wedge faces at the sides of the shoes to spread the latter apart circumferentially; and a spring resistance opposing inward movement of said shoes and secondary wedges.

7. In a friction shock absorbing mechanism, the combination with a friction casing having interior friction surfaces; of friction shoes cooperable with the casing surfaces, each shoe having on the inner side thereof longitudinally extending flat wedge face portions at opposite sides of the longitudinal center line of said inner side, adjacent of said wedge face portions of adjacent shoes converging laterally outwardly, said shoes having additional wedge faces at their front ends inclined outwardly away from the central longitudinal axis of the mechanism in a direction lengthwise of said axis; a pressure transmitting wedge block having rearwardly extending inwardly converging wedge faces; secondary wedges having wedge faces at their outer ends engaged by certain of said wedge faces of said block, the remaining wedge faces of said block having wedging engagement with the wedge faces at the front ends of said shoes, said secondary wedges also having laterally outwardly converging wedge faces cooperable with said adjacent faces of adjacent shoes to spread the latter apart circumferentially; and a spring resistance opposing inward movement of said shoes and secondary wedges, said spring resistance including inner and outer coils respectively bearing on the inner ends of said shoes and secondary wedges.

8. In a friction shock absorbing mechanism, the combination with a friction casing having interior friction surfaces; of mutually adjacent friction shoes cooperable with the casing surfaces, said shoes having respectively wedge faces on their inner sides, said wedge faces of adjacent shoes being opposed and converging laterally outwardly of the mechanism with respect to each other, said shoes having additional wedge faces at their front ends inclined outwardly away from the central longitudinal axis of the mechanism in a direction lengthwise of said axis; a pressure transmitting wedge block having rearwardly extending inwardly converging wedge faces; secondary wedges having wedge faces at their outer ends engaged by certain of said wedge faces of said block, the remaining wedge faces of said block having wedging engagement with the wedge faces at the front ends of said shoes, said secondary wedges also having laterally outwardly converging wedge faces cooperable with said opposed, first named, wedge faces of the shoes to spread the latter apart circumferentially; and a spring follower bearing on said shoes and secondary wedges and having blunt angle wedging engagement therewith.

STACY B. HASELTINE.